United States Patent [19]

LeBlanc et al.

[11] Patent Number: 4,704,144
[45] Date of Patent: Nov. 3, 1987

[54] AIR FILTERING APPARATUS

[75] Inventors: James A. LeBlanc; Reynold F. Durre, both of Eden Prairie, Minn.

[73] Assignee: Donaldson Company, Inc., Minneapolis, Minn.

[21] Appl. No.: 832,866

[22] Filed: Feb. 24, 1986

[51] Int. Cl.⁴ .............................................. B01D 46/04
[52] U.S. Cl. ...................................... 55/300; 55/432; 55/482; 55/502
[58] Field of Search ................. 55/287, 300, 302, 482, 55/487, 498, 432, 502

[56] References Cited

U.S. PATENT DOCUMENTS

| | | |
|---|---|---|
| 1,540,346 | 6/1925 | Kunz . |
| 3,759,014 | 9/1973 | Van Dy Ken et al. ................ 55/300 |
| 3,867,291 | 2/1975 | Schmidt, Jr. et al. . |
| 4,099,940 | 7/1978 | Mortensen et al. . |
| 4,135,899 | 1/1979 | Gauer . |
| 4,211,543 | 7/1980 | Tokar et al. . |
| 4,243,397 | 1/1981 | Tokar et al. . |
| 4,261,710 | 4/1981 | Sullivan . |
| 4,278,455 | 7/1981 | Nardi . |
| 4,304,580 | 12/1981 | Gehl et al. ............................ 55/498 |
| 4,345,353 | 8/1982 | Sommerfeld . |
| 4,345,922 | 8/1982 | Grassel ................................. 55/337 |
| 4,482,367 | 11/1984 | Howeth . |
| 4,557,738 | 12/1985 | Menasian . |
| 4,565,555 | 1/1986 | Menasian ............................. 55/300 |

Primary Examiner—Bernard Nozick
Attorney, Agent, or Firm—Merchant, Gould, Smith, Edell, Welter & Schmidt

[57] ABSTRACT

An air filtering apparatus is disclosed having a housing defining a chamber with an air inlet and an air outlet. A filter assembly is disposed within the housing and is provided with a first cylindrical filter element and a second cylindrical filter element received within the first element and coaxially aligned. The first filter element and second filter element are supported with opposing surfaces of said elements defining an annular chamber. One axial end of the annular chamber is fixedly sealed and the second end of the axial chamber is provided with a sealing plate connected to a diaphragm for sealing the chamber in response to a suction applied to the second filter element. An impact cleaning mechanism is provided for impacting the second filter element and cleansing it when the annular chamber is exposed.

10 Claims, 5 Drawing Figures

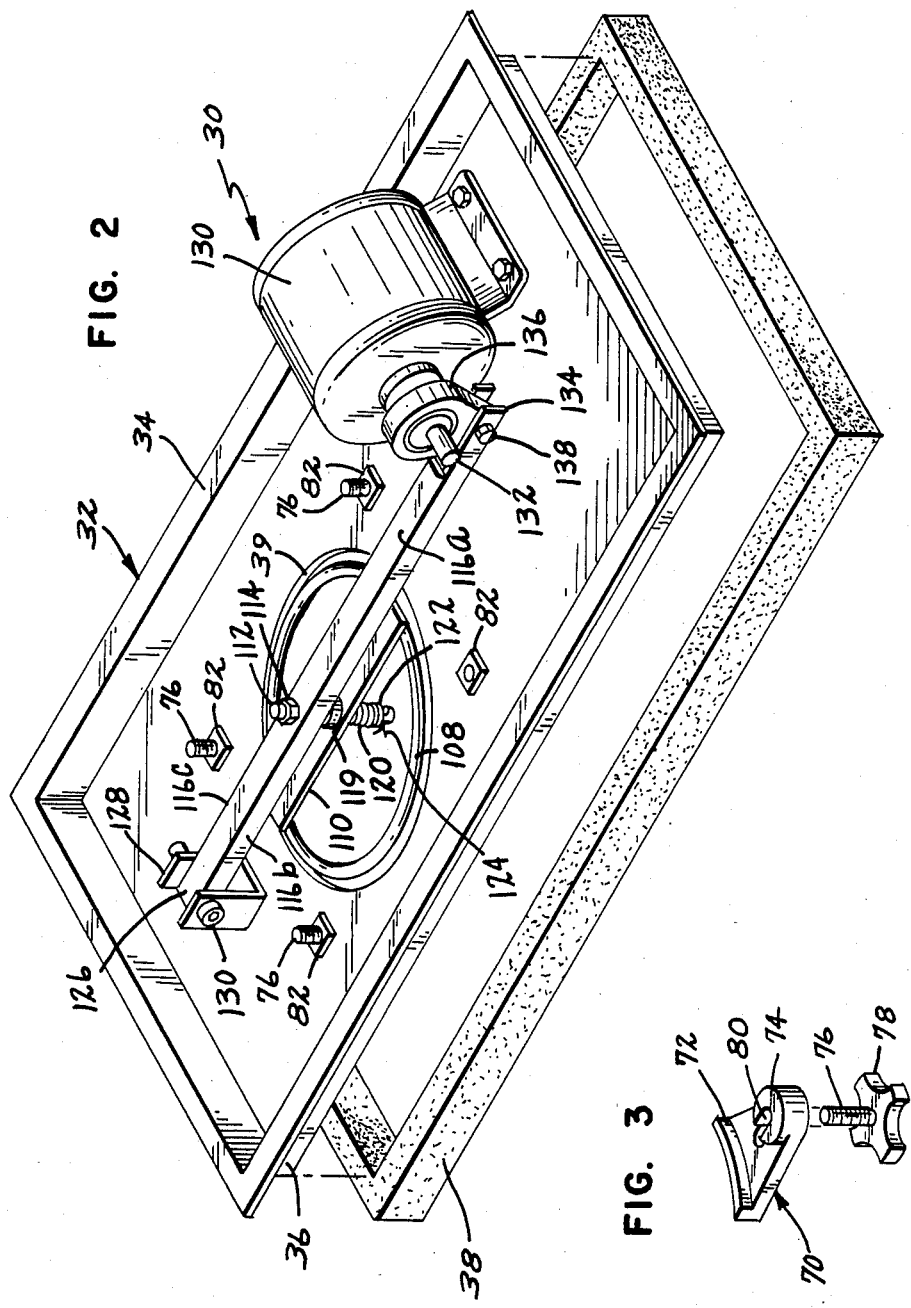

AIR FILTERING APPARATUS

BACKGROUND OF THE INVENTION

I. Field of the Invention

This invention pertains to air filtering apparatus and, more particularly, to air filtering apparatus having impact cleaning mechanisms for cleaning an air filter.

II. Description of the Prior Art

In the prior art, air filtering apparatus comprising air filters housed in a dedicated cabinet are known for removing contaminants from air exhausted from a machine in an industrial setting. Referred to as cabinet collectors, such air filtering apparatus draw dirty air from a machine such as a saw, grinder, packing machine or other source of dirty air. The cabinet collectors are usually dedicated to a particular machine in a factory and prevent the circulation of the generated contaminant into ambient air. Air flow from the machine is created by a motor/blower assembly which is housed within the dedicated cabinet.

Prior art cabinet collectors contained a plurality of cloth bags as a filter medium which collected contaminant on the outside of the bag. After a period of usage, the exterior surface of the bag would become so loaded with the contaminant that air flow through the bag would be retarded and the cabinet collector could not adequately draw contaminated air from the machine. At this point in operation, the bags would be shaken and distorted through manual or automatic means, to dislodge the loaded contaminant. The dislodged contaminant would fall into a pan in the bottom of the cabinet collector. The pan would then be removed from the collector and its contents disposed of in any suitable manner.

Several problems are encountered in use of cabinet collectors of the prior art. First, the cloth bags used as the filter media in prior art cabinet collectors are expensive. Also, the bags are difficult to install. The difficulty in installation results in erroneous installation techniques making leaks common in prior art cabinet collectors. Finally, fibrous material, such as wood chips produced in a saw, would become lodged between the bags or lodged into the bag fiber and would not be discharged during the shaking and distorting cleaning operation described above.

OBJECTS AND SUMMARY OF THE PRESENT INVENTION

It is an object of the present invention to provide an air filtering apparatus with improved means for impact cleansing of filter media.

A further object of the present invention is to provide a filtering apparatus having a multi-stage filter assembly with means for discharging a contaminant disposed between adjacent layers of filter media.

A yet further object of the present invention is to provide a cabinet collector having a multi-stage filtering element with vibratory means for cleansing the filters and means for permitting a collected contaminant to be discharged from between adjacent filter media.

According to a preferred embodiment of the present invention, an air filtering apparatus is disclosed having a housing defining a chamber with an air inlet and an air outlet. A filter assembly having a first cylindrical filter element and a second cylindrical filter element is disposed within the chamber with the second filter element supported within the first filter element. The first and second filter elements present opposing surfaces which define an annular chamber. A first axial end of the annular chamber is fixedly sealed and a second axial end of the annular chamber is provided with means for selectively sealing the second axial end. An impact cleaning mechanism is provided for impacting the second filter element.

BRIEF DESCRIPTION OF THE DRAWINGS

FIG. 2 is a perspective view of an impact cleaning mechanism of the present invention;

FIG. 3 is a perspective view of a clamp for supporting an air filtering assembly within the air filtering apparatus;

DESCRIPTION OF THE PREFERRED EMBODIMENT

Referring now to the several figures in which like elements are provided with identical numbering, the present invention will now be described with reference to a preferred embodiment.

Figure 1:
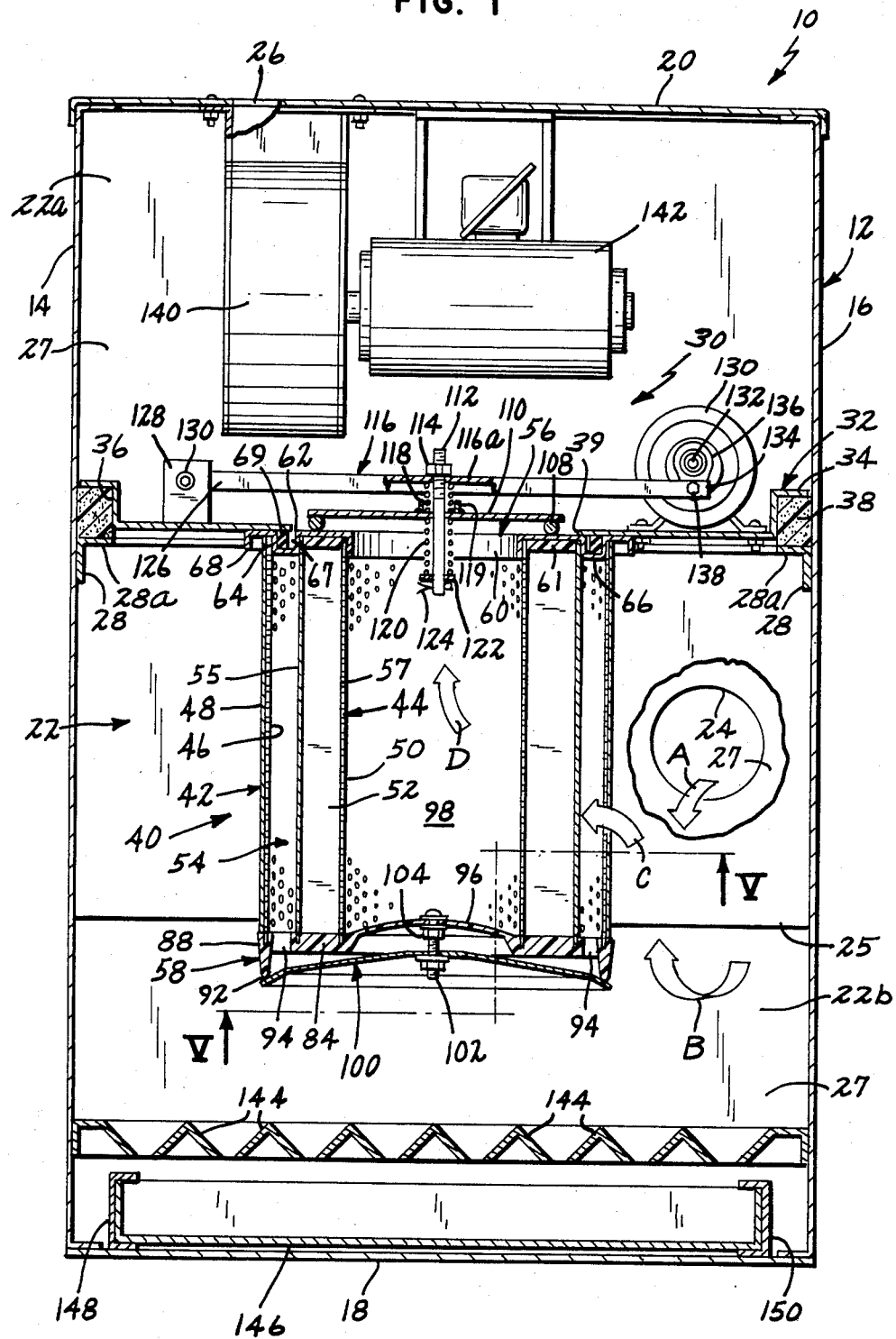
FIG. 1 is a cross-sectional view taken in elevation of an air filtering apparatus according to the present invention.

Referring to FIG. 1, an air filtering apparatus according to the present invention is shown as a cabinet collector 10 having a housing 12. The housing 12 includes side walls 14 and 16, front wall (not shown), and back wall 27 and floor 18 and ceiling 20 all of which cooperate to define a chamber 22 having an air inlet 24 and an air outlet 26. A brace 28 having an inwardly protruding flange 28a is provided secured to the interior surfaces of walls 14 and 16 and the back and front walls and extends around the interior perimeter of chamber 22 with the horizontal flange 28a separating chamber 22 into an upper portion 22a and a lower portion 22b.

An impact cleaning mechanism 30 is provided having a shaker table 32 sized to extend across the horizontal dimensions of chamber 22 and be supported on flange 28a. The shaker table 32 is provided with a channel defining perimeter 34 which defines a channel 36 for receiving a gasket 38 which directly rests on flange 28a and completely surrounds the perimeter of the shaker table 32. The shaker table 32 rests directly on the gasket 38. Gasket 38 is preferably formed from urethane and absorbs vibration of the shaker table 32 as will be more fully described. The shaker table 32 has a centrally located circular opening 39 providing air flow communication between upper chamber 22a and lower chamber 22b.

A filter assembly 40 is provided secured to the bottom surface of the shaker table 32 and extends therefrom into lower chamber 22b to filter air flowing from inlet 24 through opening 39 and out of outlet 26. The filter assembly 40 includes a first cylindrical hollow filter element 42 and a second cylindrical hollow filter element 44. As can be seen in the drawings, the filter elements 42, 44 have the same axial dimension with the second filter element 44 sized to be received within first filter element 42.

A deflecting wall 25 extends across chamber 22b between filter assembly 40 and back wall 27. The deflecting wall 25 is conventional and directs dirty air (indicated by arrow A) downwardly so the air flows from beneath wall 25 and back up (indicated by arrow B) toward assembly 40. The purpose of wall 25 is to provide more uniform distribution of dirty air on assembly 40 and provide inertial separation of the heaviest contaminants, as is conventional.

The first filter element 42 includes a cylindrical perforated metal liner 46 which supports a first filter media 48 on its exterior cylindrical surface. In a preferred embodiment, first filter media 48 is a fine mesh synthetic cloth (e.g., nylon having a 300 micrometer mesh) which is stretched about the exterior surface of metal liner 46 and secured in position through any suitable means such as by Velcro strips (not shown).

The second filter element 44 includes a second metal liner 50 having a diameter smaller than that of first metal liner 46. Second metal liner 50 provides structural support for second filter media 52 which is preferably a pleated paper filter formed in a cylinder around the outside surface of metal liner 50 with the alternating peaks and valleys such as 55 and 57, respectively, extending in a direction parallel to the cylindrical axis of metal liner 50.

As shown in the drawings, first filter element 42 and second filter element 44 are coaxially disposed and axially aligned with their common cylindrical axis being vertical and axially aligned with the center of opening 39. In this alignment, the peaks 55 of filter media 52 oppose the inner cylindrical surface of first metal liner 46 and are spaced therefrom a predetermined distance with opposing surfaces of the first metal liner 46 and second filter media 52 defining an annular chamber 54.

The first filter element 42 and second filter element 44 are maintained in the above-described alignment by upper and lower end caps 56 and 58, respectively. Shown in cross section in FIG. 1, upper end cap 56 is generally ring shaped with a first downwardly projecting cylindrical flange 60 sized to abut an inside surface of second metal liner 50 and a second cylindrical flange 62 sized to abut the peaks 55 of second filter media 52. With these dimensions, end cap 56 retains second filter media 52 in cylindrical configuration against the outer surface of second metal liner 50 with the metal liner 50 and filter media 52 snugly received between flanges 60 and 62. Plastisol 61 is deposited in conventional manner to seal the upper axial end of media 52 to cap 56 in air-tight sealing engagement. End cap 56 is also provided with a third cylindrical flange 64 concentric with flanges 60 and 62 and spaced by a spacer member 66 from flange 62 a distance equal to the radial thickness of annular chamber 54 such that flange 64 is sized to abut an inner cylindrical surface of first metal liner 46. Accordingly, flange 64 cooperates with flanges 60 and 62 to retain a coaxial alignment of first filter element 42 and second filter element 44. Spacer 66 and flanges 62 and 64 also define an upwardly facing annular channel 67 which receives a ring shaped sealing gasket 69 which abuts the bottom surface of table 32. A fourth flange 68 concentric with flanges 60, 62 and 64 extends downwardly from the outer periphery of end cap 56 and is spaced away from the outer cylindrical surface of first filter element 42 by a predetermined uniform distance.

Figure 5:
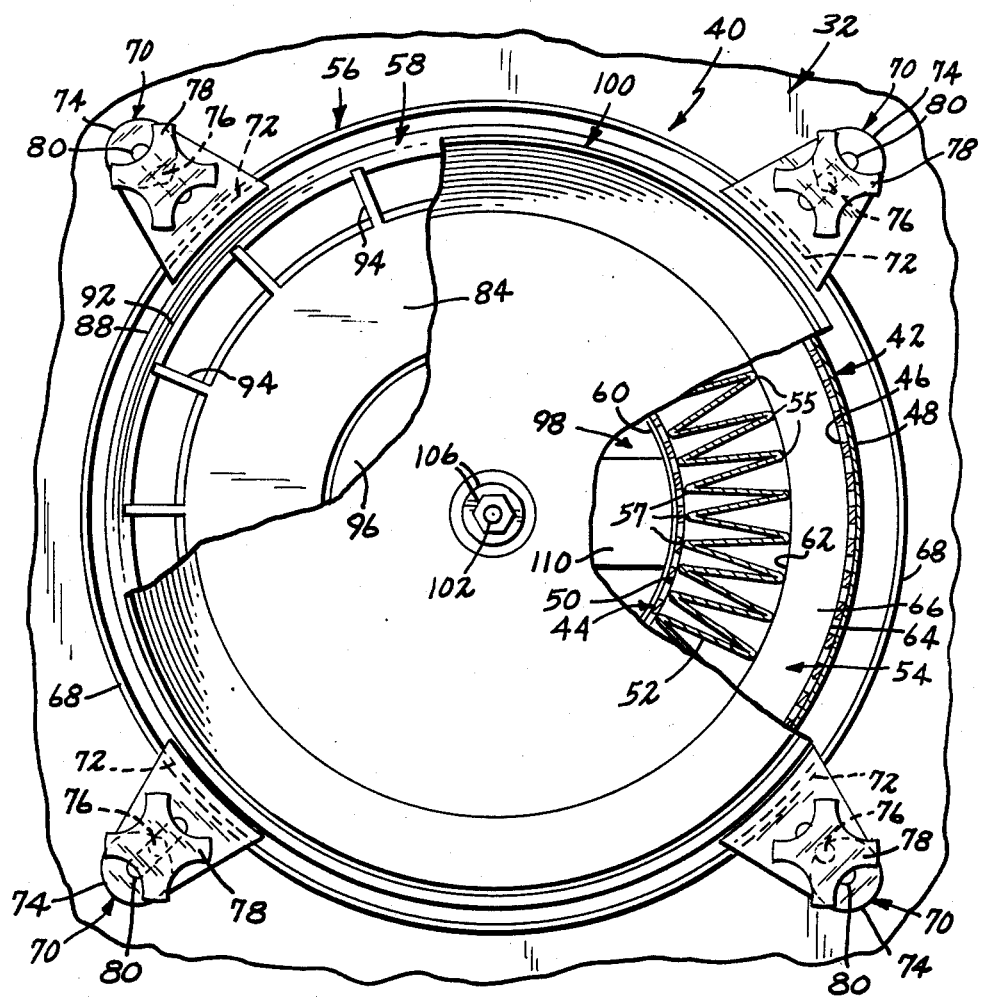
FIG. 5 is a view partially broken away taken along line V—V of FIG. 1.

The filter assembly 40 is secured to the shaker table 32 with the axis of the filter elements being vertical and passing through the center of opening 39 by means of plurality of clamps 70 which are shown in FIGS. 3 and 5. As shown, four identical clamps 70 are provided disposed at 90° intervals about filter assembly 40. The clamps 70 each include an arcuate clamp surface 72 sized to abut an interior surface of fourth cylindrical flange 68 and extend radially away to a table engaging portion 74. The upper surface of portion 74 abuts the bottom surface of shaker table 32. A threaded stud 76 having a handle 78 extends through an elongated slot 80 formed through clamp 70 and is received through preformed holes formed in shaker table 32 and threadedly engage a nut 82 on the upper surface of shaker table 32. Elongated slot 80 permits slight adjustment of the positioning of assembly 40.

Figure 4:
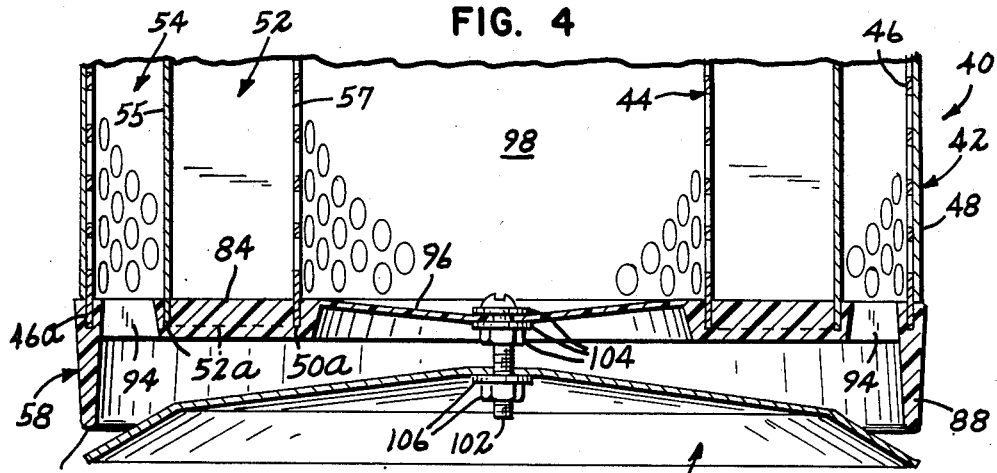
FIG. 4 is an enlarged cross-sectional view of a portion of the air filter assembly of the present invention.

The bottom axial end of the filter assembly 40 is retained in proper alignment by means of lower end cap 58, the structure of which will now be described with reference to FIGS. 4 and 5. Lower end cap 58 is preferably molded from urethane or other suitable material and includes a first ring portion 84 having a radial thickness slightly greater than the radial thickness of second filter element 42. Lower end cap 58 also includes a cylindrical sealing portion 88 sized to receive first metal liner 46 with the sealing portion 88 extending axially away from the first metal liner 46 and terminating at a rounded free end 92. Cylindrical sealing portion 88 is maintained in concentric spaced away relation to ring portion 84 by a plurality of radial ribs 94 extending between ring portion 84 and sealing portion 88. The center of lower end cap 58 has a reduced axial thickness portion 96 covering the lower axial end of the chamber 98 defined by opposing inner surface of second metal liner 50. Portion 96 has a reduced thickness sufficient to be flexible in response to a suction applied to chamber 98 such that portion 96 comprises a diaphragm which will bulge upwardly in response to a suction in chamber 98.

End cap 58 is molded by forming a mold to define the shapes of sealing portion 88, ribs 94 and ring portion 84. A circular sheet of urethane of suitable thickness (preferably 20 mil) is placed in the mold in the desired position of diaphragm 96. Urethane is poured into the mold and second metal liner 50, pleated filter media 52 and first metal liner 46 are set in the mold. After the urethane sets, diaphragm 96 is bonded to end cap 58 and the lower axial ends 46a, 52a and 50a of liner 46, media 52 and liner 50, respectively, are bonded to cap 58 in air-tight sealing engagement.

A sealing plate 100 is provided having a diameter sufficient to cover annular chamber 54 with its perimeter sized to engage the free end 92 of sealing portion 88 in abutting air-tight sealing engagement. Sealing plate 100 is secured to diaphragm 96 by means of a bolt 102 passing through the center of diaphragm 96 and through the center of sealing plate 100 with the bolt secured to the diaphragm by first nut and washer means 104 and to the sealing plate by second nut and washer means 106. As shown in FIG. 4, when a suction is not applied to the interior chamber 98, diaphragm 96 bulges downwardly due to gravitational forces acting on it and sealing plate 100. Seal plate 100 is shaped and secured to diaphragm 96 such that the axial spacing between free end 92 and the periphery of seal plate 100 equals the stroke of the center of the diaphragm 96 moving to an upward position (as shown in FIG. 1) in response to a suction applied to chamber 98.

With reference to FIGS. 1 and 2, the impact mechanism 30 of the present invention will now be described in greater detail. Mechanism 30 includes a striking element 108 in the form of a ring having a diameter sized for the ring 108 to oppose the end cap 56 adjacent the upper axial end of second filter media 52. A cross bar 110 is welded to ring 108 and passes through its diameter.

The center of cross bar 110 is provided with a hole through which a threaded stud 112 passes freely. Stud 112 is secured by means of a nut 114 to a horizontal pivot arm 116 with stud 112 extending coaxially with filter assembly 40. A first compression spring 118 is provided surrounding stud 112 between cross bar 110 and pivot arm 116 with the ends of the spring 118 opposing surfaces of pivot arm 116 and cross bar 110. A second spring 120 surrounds stud 112 on an opposite side of cross bar 110 with its ends opposing cross bar 110 and a washer plate 122 held in place by means of a cotter pin 124. A cylindrical guide 119 is welded to cross bar 110 surrounding spring 118. Guide 119 has an inside diameter approximately equal to the outside diameter of spring 118. As cross bar 110 moves (as will be described) guide 119 assures alignment of stud 112 within the hole of cross bar 110.

Pivot arm 116 has a first end 126 pivotally secured to a U-shaped bracket 128 mounted on the upper surface of the shaker table 32. As shown best in FIG. 2, pivot arm 116 is a downwardly facing U-shaped channel with the pivot end 126 pivotally secured to bracket 128 by means of a bolt 130 passing through U-shaped bracket 128 and the channel sides at pivot end 126 of arm 116. A motor 130 is mounted on the upper surface of shaker table 32 with its shaft 132 extending horizontally and perpendicular to pivot arm 116. As shown in FIG. 2, an upper plate portion 116a of pivot arm 116 is cut away at second end 134 with an eccentric link 136 secured to shaft 132 extending between opposing channel defining walls 116b and 116c. A pin 138 passing through walls 116b and 116c and linkage 136 pivotally connects the linkage 136 to the pivot arm 116. Linkage 136 is a commercially available eccentric linkage such that as shaft 132 rotates about its axis, linkage 136 moves up and down a distance equal to two times the off center distance of the eccentric linkage. Accordingly, as shaft 132 rotates, pivot arm 116 moves in a cyclic manner with a frequency which can be controlled by controlling the rotational speed of shaft 132.

Referring to FIG. 1, upper chamber 22a is provided with a blower 140 in communication with outlet 26. A motor 142 is provided for activating the blower 140 as is conventional. The bottom of lower chamber 22b is provided with a plurality of louvre panels 144 disposed above a pan 146 slideably received within opposing channel members 148 and 150. The pan 146 is slideable to be removed from the cabinet by opening an access door (not shown) adjacent the pan 146.

In operation, the inlet 24 of the cabinet collector 10 is connected by means of a hose to a hood of a machine such as a saw. During operation of the machine, the blower 140 is activated to draw a suction. In response to this suction, diaphragm 96 bulges upwardly as shown in FIG. 1 and carries with it sealing plate 100. The peripheral edge of sealing plate 100 abuts the free end 92 of end cap sealing portion 88 in sealing engagement thereby sealing the lower axial end of annular chamber 54. With the suction applied, dirty air is drawn into lower chamber 22b through inlet 24. The dirty air is represented by the arrow A shown in FIG. 1. The air is deflected downwardly by wall 25 and flows up from beneath wall 25 toward assembly 40 as indicated by arrow B. The heaviest of contaminants are removed by inertial separation and fall to pan 146. As the dirty air passes through the first filter element 42, large contaminants and fibrous material are removed from the air flow by means of the fine mesh of first filter media 48. The air flow passes into annular chamber 54 (as shown by arrow C) and, due to the initial screening of the first filter element 42, is partially cleansed. The partially cleansed air flow passes from annular chamber 54 through second filter media 52 into chamber 98. As the air flow passes through the second filter media 52, small particulates are removed from the air flow and collect on the outer surface of second filter media 52. The cleansed air represented by arrow D flows from chamber 98 into upper chamber 22a through opening 39 and is forced out of the cabinet 10 by blower 140. During this cleansing operation, the sealing plate 100 seals the lower axial end of annular chamber 54 preventing the dirty air containing large or fibrous material from entering chamber 54 and becoming lodged onto the second filter media 52.

After the filter assembly 40 has been in service for a period of time, small particulates will accumulate on second filter media 52 reducing its capacity and effectiveness. When this occurs, it is desirable to clean filter media 52. To accomplish this, blower 140 is turned off and the suction in chamber 98 is terminated. When this occurs, the diaphragm 96 relaxes and due to the influence of gravity acting upon it and sealing plate 100, moves to the downwardly bulging position shown in FIG. 4. In this position, the sealing plate 100 is axially spaced from free edge 92 of sealing portion 88 thereby exposing annular chamber 54. Material within annular chamber 54 may drop onto plate 100 and, due to the downwardly projecting angles of plate 100, fall to the bottom of lower chamber 22b.

To dislodge particulate material from the surface of the second filter media 52, motor 130 is energized causing pivot arm 116 to move up and down in a cylic manner. Accordingly, stud 112 is excited to move in a cylical vertical direction. The resilient connection of the striker bar 108 to stud 112 by means of springs 118 and 120 causes the striker member 108 to also move in a cyclical manner and to strike upper end cap 56 at the downward portion of its cyclical stroke. The frequency of the excitation is tuned to equal the frequency of the spring-mass system of the striker member 108 and springs 118 and 120. Tuning the frequency to be equal to the resonant frequency, permits use of a small horsepower motor 130 to drive the impact cleaning mechanism 30 and also results in a small displacement for stud 112. Vibration of the shaker table 132 is taken up by urethane gasket 38. Gasket 69 disposed between shaker table 32 and end cap 56 maintains a seal between upper end cap 56 and table 32. As the striker member 108 moves in its cylic path it repeatedly impacts on cap 56 with the impact being transmitted to filter media 52. As a result, particulates lodged on the surface of filter media 52 are forced by result of the impact to become dislodged and fall from annular chamber 54 to the bottom of lower chamber 22b.

The particulates which fall to the bottom of chamber 22b are collected in pan 146. The louvres 144 covering pan 146 prevents re-entrainment of the dirty particulates by blocking air circulation into pan 146.

From the foregoing, it can be seen how the objects of the present invention have been obtained in a preferred manner. For example, the two-stage cleansing of air flow results in fibrous material being screened by the fine mesh of the nylon material of the first filter media 48. This media may easily be removed from liner 46 and washed clean. As a result, the fibrous material does not contact the pleated paper filter and avoids the problems found in the prior art where fibrous material would become lodged on the prior art filter bags. The diaphragm 116 and seal plate 100 provide automatic means for insuring that fibrous material does not flow into the annular chamber 54 but also provides an opening to permit dirt to be discharged from chamber 54 to periodically clean the second filter media 52. The novel impact cleaning mechanism 30 provides means for effectively cleaning filter media 52 with a minimum of required horsepower. The impact cleaning mechanism can be activated by either a timer or a pressure switch to operate only when air flow through the cabinet collector 10 has stopped.

While the foregoing is a description of the preferred embodiment of the present invention, numerous other embodiments will become apparent to those having skill in the art. Accordingly, it is not intended that the scope of the present invention be limited to the present embodiment. It is the intent that the scope of the present invention will include such modifications and equivalents as shall occur to those skilled in the art. Accordingly, the scope of the present invention is intended only to be limited by the scope of the claims which are appended hereto.

What is claimed is:

1. An air filter assembly comprising:
   a first hollow filter element having an interior and an exterior separated by a first filter media;
   a second hollow filter element having an interior and and exterior separated by a second filter media, said second filter element sized to be received within said first filter element;
   means for supporting said second filter element within said first filter element with surfaces of said second and first filter elements disposed in spaced apart opposing relation, said opposing surfaces defining a chamber having an opening connecting said chamber in material and air flow communication with said exterior of said first filter element;
   a sealing plate sized to cover said opening and close said material and air flow communication between said chamber and said exterior of said first element when said sealing plate is disposed in a sealing position covering said opening;
   a diaphragm of flexible material movable from a first position to a second position in response to a pressure differential due to a pressure in an interior of said second filter element being less than a pressure exterior of said second filter element, said diaphragm movable to return to said first position upon discontinuance of said pressure differential; and
   means for connecting said sealing plate to said diaphragm for movement therewith with said sealing plate disposed in said sealing position when said diaphragm is in said second position and said sealing plate exposing said opening when said diaphragm is in said first position.

2. An air filtering assembly according to claim 1 wherein said first and second filter elements are generally cylindrical and opposing surfaces of said elements define an annular chamber;
   means for sealing a first axial end of said annular chamber;
   said sealing plate sized to cover said annular chamber on a second axial end thereof and seal against axial edges of said first filter element.

3. An air filtering assembly according to claim 2 wherein said sealing plate is sized to cover an axial end of said first element.

4. An air filtering assembly according to claim 2 wherein said diaphragm comprises a flexible material covering an axial end of said second element in sealing engagement.

5. An air filtering assembly according to claim 2 comprising:
   a first rigid cylindrical perforated support member having a first filter media secured to said support member;
   a second perforated cylindrical perforated support member sized to be received within said first support member and having a second filter media with said second filter media spaced from said first filter media by predetermined dimension define an annular chamber.

6. An air filtering assembly according to claim 2 comprising:
   an end cap of molded material having a first ring portion sized to engage an axial end of said second filter element and a cylindrical portion spaced from said ring portion and sized to engage an axial end of said first filter element with said cylindrical portion and said ring portion maintained in concentric spaced relation by a plurality of spacer ribs; and
   a reduced thickness portion extending between opposing surfaces of said ring portion and having a thickness sized to deform in response to a suction applied to said second filter element.

7. An air filtering apparatus comprising:
   a housing defining a housing chamber having an air inlet and an air outlet;
   a filter assembly sized to be received within said housing chamber and including a first hollow cylindrical filter element and a second hollow cylindrical filter element sized to be received within said first filter element, support means for supporting said second filter element within said first filter element with cylindrical surfaces of said first and second filter elements disposed in opposing spaced relation, said opposing cylindrical surfaces defining an annular chamber having first and second axial ends, first seal means for sealing said first axial end of said annular chamber;
   second seal means for selectively opening and closing said second axial end of said annular chamber with said annular chamber being in material and air flow communication with an exterior, of said filter assembly when said second axial end is open and said annular chamber being sealed to block air flow through said second axial end when said end is closed;
   means for supporting said filter assembly within said housing chamber with said assembly disposed for air to flow through each of said first and second filter elements when passing from said inlet to said outlet when said second seal means is closing said second axial end, said assembly further disposed for said annular chamber to be in material flow communication with said housing chamber exterior of said filter assembly when said second seal means opens said second axial end; and impact cleaning means for impacting said second filter element and urging particulate material from said second filter element and into said annular chamber, whereby said filter assembly may filter air flowing through said first and second filter elements when said second seal means is closing said second axial end and said second filter element may be cleaned by having said second seal means selected to open said second axial end and expose said annular chamber and said impact cleaning means may impact said second filter element to dislodge debris from said second filter element with said debris discharged from said annular chamber through said second axial end.

8. An air filtering apparatus according to claim 7 wherein said impact cleaning means comprises a striking member, means for resiliently supporting said striking member with said member movable through a cycle to cyclically impact said second filter element, and means for imparting a motive force to said striking member to move said member through said cycle.

9. An air filtering apparatus according to claim 7 wherein said second seal means is responsive to pressure within said second filter element it seal said second axial end in response to a suction applied to an interior of said second filter element.

10. An air filtering apparatus according to claim 9 wherein said first and second filter elements are disposed with generally vertical cylindrical axes and said impact cleaning means comprises a striking member disposed above said filter assembly and resiliently supported to move to cyclically impact said assembly;

said second seal means comprising a diaphragm of flexible material sealing an axial end of said second filter element and flexible in response to pressure within said second filter element to move from a relaxed position to a second position when a suction is applied to said second filter element;

a seal plate sized to cover said annular opening and connected to said diaphragm for movement therewith with said seal plate abutting said assembly in sealing engagement when said diaphragm is in said second position and exposing said annular chamber when said seal plate is in said relaxed position.

* * * * *